H. F. BICKEL & G. O. HAMMOND.
BRAKE APPARATUS.
APPLICATION FILED APR. 24, 1911.
1,052,999.
Patented Feb. 11, 1913.
2 SHEETS—SHEET 2.
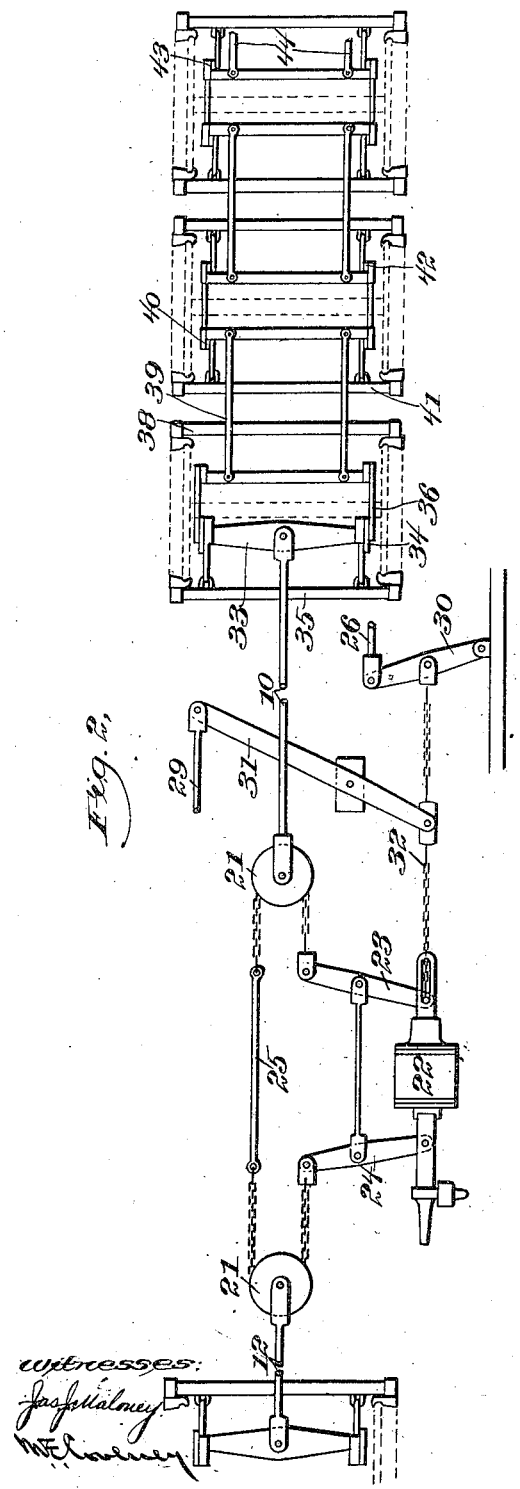
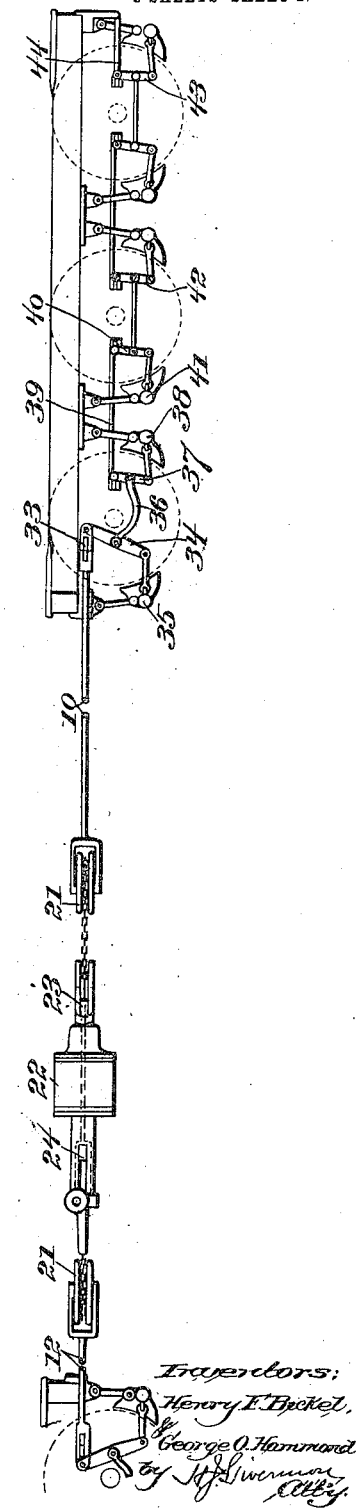

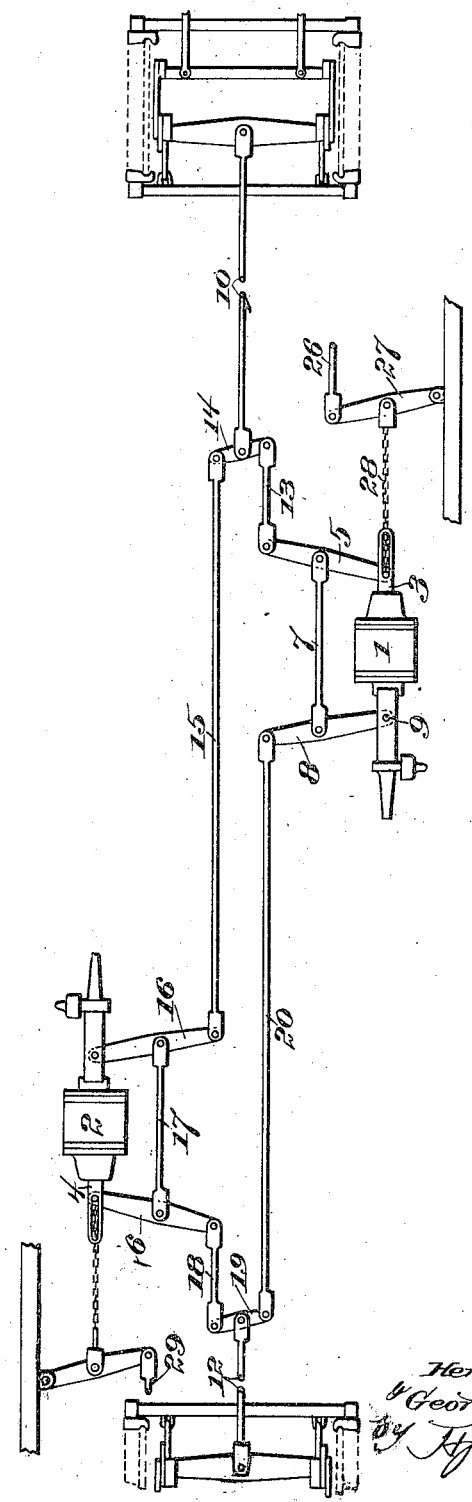

UNITED STATES PATENT OFFICE.

HENRY F. BICKEL, OF PLAINFIELD, NEW JERSEY, AND GEORGE O. HAMMOND, OF WATERTOWN, NEW YORK, ASSIGNORS TO THE NEW YORK AIR BRAKE COMPANY, A CORPORATION OF NEW JERSEY.

BRAKE APPARATUS.

1,052,999.  Specification of Letters Patent.  Patented Feb. 11, 1913.

Application filed April 24, 1911. Serial No. 622,888.

*To all whom it may concern:*

Be it known that we, HENRY F. BICKEL and GEORGE O. HAMMOND, both citizens of the United States, residing, respectively, in Plainfield, county of Union, and State of New Jersey, and in Watertown, county of Jefferson, State of New York, have invented an Improvement in Brake Apparatus, of which the following description, in connection with the accompanying drawings, is a specification, like letters on the drawings representing like parts.

The present invention relates to a railway brake apparatus, and is embodied in a novel construction and arrangement of multiplying connections, whereby the power delivered either by fluid pressure or by the mechanically operated brake rods or hand brake apparatus is multiplied at the point of application, thus increasing the actual brake shoe pressure with respect to the power applied. The construction is such, moreover, that the multiplying connections can be installed without taking up any more space than is readily available, and without unduly complicating the apparatus and thereby increasing the cost.

The brake apparatus is herein shown as applied to a passenger coach having six-wheel trucks, each pair of wheels being equipped with two brake beams, one at each side. In the air brake construction, it is practicable to use two brake cylinders on each coach, although, in some cases, one brake cylinder will answer the purpose; and for purposes of illustration, both of these arrangements are herein shown.

Figure 1 is a top plan view of the brake mechanism embodying the invention, showing two brake cylinders and the connections to the brake yokes at opposite ends of the car; Fig. 2 is a similar view showing a brake apparatus employing one brake cylinder only, and a modified form of multiplying connections, the same view showing one of the trucks complete; and Fig. 3 is a side elevation of the same structure as that shown in Fig. 2.

Referring to Fig. 1, the apparatus is equipped with the brake cylinders 1 and 2 at opposite sides of the car, the said cylinders being provided, respectively, with the operating piston rods 3 and 4 which are arranged to actuate the main brake operating levers 5 and 6. Each of said levers is arranged to act through an equalizing fulcrum which is shown as the point of connection between the lever and a link connected with what may be termed a reacting lever having a stationary pivotal support at one end. Referring to the lever 5, the equalizing fulcrum consists of the point of connection between said lever 5 and a link 7 which is connected with the reacting lever 8 having a stationary pivotal support 9, it being obvious, therefore, that when the piston rod 3 moves to the right it will tend to move the upper end of the lever 5 to the left around the equalizing fulcrum, while the same movement acting through the link 7 tends to move the upper end of the reacting lever 8 to the right.

As thus far described, the construction is substantially the same as that usually employed, the main actuating lever moving the rod connected with the brake beam on one truck in one direction while the reacting lever operates to move the brake beam on the other truck in the opposite direction, the pressure being equalized throughout by the operation of the movable fulcrums. In accordance with this invention, however, the brake rods 10 and 12, at the opposite ends of the car, instead of being directly connected with the operating and reacting levers, are connected therewith through a multiplying connection which increases the applied power. In the two cylinder construction shown in Fig. 1, the multiplying connections to the brake rods 10 and 12 extend from the operating lever of one cylinder to the reacting lever of the other cylinder, so that the pressure is equalized throughout under all circumstances.

In the construction shown in Fig. 1, the operating lever 5 is connected through a link 13 with one end of a lever 14, the other end of which is connected through a link 15 with the reacting lever 16 connected, through the link 17 which is the equivalent of the link 7, with the operating lever 6. The said operating lever 6, in turn, is connected through the link 18 with the lever 19, the opposite end of which is connected through the link 20 with the reacting lever 8.

The brake rods 10 and 12 are pivotally connected, respectively, with the levers 14 and 19 at a point between the ends thereof, the extent to which the power is multiplied depending upon the location of this point of connection with relation to the points of connection of the links which extend to the brake levers. In the construction shown, the brake rods are connected about midway between the links, so that the power applied to the shoes is practically doubled.

It is obvious that the multiplying connection between the brake levers and the brake rods 10 and 12 may be modified, and in Fig. 2 the connection is shown as provided for by means of sheaves 21 connected at their axes with the brake rods 10 and 12, the brake levers being connected with chains which pass over said sheaves and are connected with the reacting parts, so that the operation is equivalent to that described. In Fig. 2, moreover, the apparatus is shown as operated through the agency of a single cylinder 22, and the operating and reacting levers 23 and 24 connect directly with the multiplying connections for both brake rods, the said multiplying connections being a single unit in this case, the chains being shown as connected together by means of a link 25, so that the movement of the two brake levers will draw the sheaves toward each other, thereby setting the brakes on both trucks.

The hand brake apparatus is connected directly to the main operating lever, which has a lost motion connection with the brake cylinder piston rod, so that the brakes can be operated independently of any movement of the said piston rod.

In the construction shown in Fig. 1, the brake rod 26, which goes to the hand brake apparatus at one end of the car, is connected through a lever 27 and chain 28 with the main operating lever 5, while the brake rod 29 which goes to the other platform is similarly connected with the operating lever 6. The brake cylinder piston rods 3 and 4 are shown as provided with slots which constitute lost motion connections, so that the levers 5 and 6 can be operated through the rods 26 and 29 while the brake cylinder piston remains stationary.

In the construction shown in Figs. 2 and 3, where there is only one brake operating lever, the hand operated brake rods 26 and 29 are connected through levers 30 and 31 with the same chain 32, connected with the brake operated lever 23.

The construction and arrangement of the brake beams and shoes employed in connection with this invention is shown in Figs. 2 and 3. In this construction, the brake rod 10 is connected with the yoke 33 at the middle thereof, and the said yoke is connected with levers 34 at opposite ends of the yoke, the said levers being also connected with the ends of the brake beam 35 which is supported on hangers in the usual way. The said levers 34 are in turn connected through connecting links 36 with floating levers 37 connected with the brake beam 38 at the opposite side of the wheel. The links 36 extend from points near the middles of the levers 34 to points near the middles of the levers 37, it being obvious that a movement of the yoke 33 to the left will draw the brake beams in opposite directions until the brakes are set at both sides of the wheel. The floating levers 37 are connected by means of links 39 to the floating levers 40 having similar connections with the brake beam 41 at the adjacent side of the next wheel, the floating levers 40 being connected across to the floating levers 42, the connections being the same throughout, so that a pull on the yoke 33 will set all the shoes. The floating levers 43 which are the last in the series, are connected to rods 44 fixed in position, the connection between the last floating lever and this rod thus constituting a permanent fulcrum for the whole system of brake beams.

What we claim is:

1. In a brake apparatus, a main operating lever; a reacting lever connected therewith; a brake rod to operate the brake beams and shoes; and a multiplying connecting device for connecting the brake rod and the main operating lever and the reacting lever.

2. In a brake apparatus, a main operating lever; a reacting lever connected therewith; a brake rod to operate the brake beams and shoes; and a multiplying lever connected at one end with the main operating lever, and at the other end with the reacting lever, the brake rod being connected with said multiplying lever at a point between the ends thereof.

3. In an air-brake apparatus having two brake cylinders, a main lever for each cylinder; a reacting lever for each cylinder; multiplying devices connecting the main lever of one cylinder with the reacting lever of the other; and a brake-rod connected with each multiplying device.

4. In an air brake apparatus having two brake cylinders, a main lever for each cylinder; a reacting lever for each cylinder; a multiplying lever for each cylinder connected at one end with the operating lever of one cylinder, and at the other end with the reacting lever of the other cylinder; and a brake rod connected with each multiplying lever at a point between its ends.

5. In a brake system, the combination with a pair of suspended brake beams adapted to be moved toward the wheels in opposite directions; of levers pivotally connected at one end with one of said brake beams, and at the other end with the truck; similar levers pivotally connected at one end with the other brake beam, and at the other end with a brake rod; a connecting link pivotally connecting said levers at points between the ends thereof; a main operating lever; and a multiplying connecting device for connecting the said brake rod with the said main operating lever.

In testimony whereof, we have signed our names to this specification in the presence of two subscribing witnesses.

HENRY F. BICKEL.
GEORGE O. HAMMOND.

Witnesses:
F. M. WHYTE,
H. A. MUNSELL.